(12) United States Patent
Gustafsson et al.

(10) Patent No.: US 11,237,005 B2
(45) Date of Patent: Feb. 1, 2022

(54) METHOD AND ARRANGEMENT FOR SOURCING OF LOCATION INFORMATION, GENERATING AND UPDATING MAPS REPRESENTING THE LOCATION

(71) Applicant: ZENUITY AB, Gothenburg (SE)

(72) Inventors: Tony Gustafsson, Askim (SE); Joakim Sörstedt, Gothenburg (SE); Erik Stenborg, Gothenburg (SE); Mats Kvarnström, Billdal (SE); Roza Maghsood, Västra Frölunda (SE); Andreas Löfman, Gothenburg (SE); Linlin Guo, Gothenburg (SE)

(73) Assignee: ZENUITY AB, Gothenburg (SE)

( * ) Notice: Subject to any disclaimer, the term of this patent is extended or adjusted under 35 U.S.C. 154(b) by 166 days.

(21) Appl. No.: 16/556,508

(22) Filed: Aug. 30, 2019

(65) Prior Publication Data

US 2020/0072620 A1 Mar. 5, 2020

(30) Foreign Application Priority Data

Sep. 3, 2018 (EP) .................................... 18192330

(51) Int. Cl.
*G01C 21/32* (2006.01)
*G01S 17/89* (2020.01)
(Continued)

(52) U.S. Cl.
CPC .............. *G01C 21/32* (2013.01); *G01S 13/89* (2013.01); *G01S 17/89* (2013.01); *G01S 19/47* (2013.01);
(Continued)

(58) Field of Classification Search
CPC ......... G01C 21/32; G01S 19/49; G01S 13/89; G01S 17/89; G01S 17/023; G01S 19/51; G01S 19/47; G06K 9/00808; H04L 67/12
See application file for complete search history.

(56) References Cited

U.S. PATENT DOCUMENTS 9,140,792 B2    9/2015  Zeng
2004/0073360 A1*  4/2004  Foxlin .................... G01C 21/16
                                                                701/517

(Continued)

*Primary Examiner* — Quoc A Tran
(74) *Attorney, Agent, or Firm* — Duane Morris LLP; Gregory M. Lefkowitz; Randall C. Pyles

(57) ABSTRACT

Described herein is a method and arrangement (11) for sourcing of location information, generating and updating maps (16) representing the location. From at least two road vehicle (12) passages at the location is obtained (1, 2) vehicle registered data on the surrounding environment from environment sensors and positioning data from consumer-grade satellite positioning arrangements and from at least one of an inertial measurement unit and a wheel speed sensor. The positioning data is smoothed (3) to establish continuous trajectories for the respective vehicles (12). Individual surrounding environment maps are created using the data from each respective vehicle (12) passage at the location. From the individual surrounding environment maps are identified submaps (15) sharing area segments. Pairs of submaps (15) sharing area segments are cross-correlated (6). The information from the pairwise cross-correlation (6) of submaps (15) is used for optimizing each submaps (15) offset relative a full map (16) of the surrounding environment and the submaps (15) are merged into the full map (16).

10 Claims, 2 Drawing Sheets

(51) Int. Cl.
  *G01S 13/89* (2006.01)
  *G01S 19/51* (2010.01)
  *G01S 19/47* (2010.01)
  *H04L 29/08* (2006.01)
  *G01S 19/49* (2010.01)
  *G06F 17/00* (2019.01)

(52) U.S. Cl.
  CPC ............... *G01S 19/49* (2013.01); *G01S 19/51* (2013.01); *H04L 67/12* (2013.01)

(56) References Cited

U.S. PATENT DOCUMENTS

| | | |
|---|---|---|
| 2008/0033645 A1 | 2/2008 | Levinson et al. |
| 2013/0103298 A1 | 4/2013 | Becker et al. |
| 2014/0005933 A1 | 1/2014 | Fong et al. |
| 2014/0379254 A1 | 12/2014 | Miksa et al. |
| 2018/0005407 A1* | 1/2018 | Browning ............ G05D 1/0246 |
| 2018/0188039 A1* | 7/2018 | Chen ..................... B60W 40/06 |
| 2018/0216942 A1* | 8/2018 | Wang ...................... G01S 17/89 |
| 2018/0225835 A1* | 8/2018 | Harada ................. G01C 21/32 |
| 2018/0321046 A1 | 11/2018 | Titze et al. |

* cited by examiner

METHOD AND ARRANGEMENT FOR SOURCING OF LOCATION INFORMATION, GENERATING AND UPDATING MAPS REPRESENTING THE LOCATION

CROSS-REFERENCE TO RELATED APPLICATIONS

This application claims priority to European Patent Application No. EP18192330.1, filed Sep. 3, 2018, the entire contents of which are incorporated herein by reference.

TECHNICAL FIELD

The present disclosure relates generally to autonomous vehicle localization technologies, and particularly to a method for sourcing of location information, generating and updating maps representing the location. It also relates to an arrangement for sourcing of location information, generating and updating maps representing the location.

BACKGROUND

Autonomous driving (AD) is currently one of the largest engineering challenges in the automotive industry. With the help of digitized solutions road safety can be greatly improved, significantly reducing casualties. Furthermore, traffic efficiency, driving comfort and most notably environmental impact can be improved with the help of AD by reducing traffic jams, potentially causing increased emissions of carbon dioxide compared to normal driving scenarios In order to safely guide autonomous vehicles on the road, it is paramount to have access to precise positioning information. Previously, precise positioning maps have hitherto mainly been created by survey vehicles using high-precision equipment, particularly expensive high-precision global positioning system (GPS) sensors with centimeter-accuracy, such as so-called real time kinematic (RTK) GPS sensors. However, this is a costly process which does not scale well with the increased need for continuous up-to-date maps of the environment for AD purposes as road networks are constantly changing. Thus, when maps need to be quickly and continuously updated, this approach is no longer viable.

In order to address this issue, it has been suggested to crowd-source maps through a fleet of vehicles using consumer-grade satellite positioning arrangements, such as consumer-grade GPS arrangements available in most cars. Using consumer-grade satellite positioning arrangements will however introduce uncertainty with regards to the actual position of each vehicle.

One attempt at addressing this issue is presented by US2013103298 A1, which discloses a method for determining a location of a vehicle. The method includes steps of acquiring a plurality of sensor data from a radar sensor associated with the vehicle; obtaining an approximate location of the vehicle using a GPS unit; comparing the sensor data to a database of geo-referenced sensor data; and based on the comparison, determining a location of the vehicle.

US2013103298 A1 also discloses a method of assembling a high-resolution database for precise vehicle localization. The method includes steps of obtaining a plurality of radar sensor readings from at least one vehicle; obtaining a plurality of GPS unit readings from the at least one vehicle, where the GPS readings are correlated with the radar sensor readings; and processing the radar sensor readings and the GPS unit readings to generate a geo-referenced database of radar data. As an alternative to using a high-resolution/augmented GPS system to build the database, or to supplement and update the database, data can be obtained from a number of vehicles traveling the various roadways, where these vehicles are equipped with typical low-resolution GPS units and low- or high-resolution radar systems. High-resolution GPS is relatively expensive, and the systems used to augment GPS information in order to provide higher resolution may not be available in all locations.

Furthermore, according to US2013103298 A1, as road conditions change (e.g. due to factors such as construction, weather, traffic accidents, etc.) there is a need to keep the database accurate and up-to-date. Accordingly, in one embodiment, the database is developed and/or updated by incorporating data obtained from numerous vehicles traveling the various roadways equipped with typical low-resolution GPS units and low- or high-resolution radar systems. The radar data gathered by such systems, along with accompanying GPS data, is transmitted from the vehicles (e.g., in real-time using wireless data communications) to a central location where it is averaged and incorporated into the database.

Although measurements from a single vehicle with low-resolution GPS will be relatively inaccurate, US2013103298 A1 suggest that the average of many such measurements will provide measurements with higher resolution. Averaging low-resolution data collected from vehicles traveling the particular routes can be used to build the database in the first place and can also be used to keep the database up to date, regardless of how it is initially developed. In addition, an IMU system collects data about the measurement vehicle's velocity and orientation which can be used, along with information from the GPS unit and rotary encoders on the wheels, to track the position of the measurement vehicle. Data from other sensors can be combined with radar sensor data to enhance the information that is available. For example, under suitable conditions video image data can be analyzed to identify particular structures (e.g. buildings) and their dimensions with better accuracy than radar sensor data, since image data provides better angular resolution than radar.

Other attempts at addressing this issue, e.g. such as described by US2014379254 A1 discloses a positioning method for use in a vehicle navigation or mapping system, and a system implementing such a method. The method comprises obtaining one or more sets of sensor measurement data from at least one sensor located on or in a vehicle, each set of sensor measurement being indicative of the distance of objects in an environment around the vehicle from the sensor, and each set of sensor measurement data comprising data obtained from a range of positions in a time or distance window along the direction of travel of the vehicle.

According to US2014379254 A1 a correlation procedure is performed correlating the one or more sets of sensor measurement data with stored reference sensor measurement data, and a relative position of the vehicle against stored location data associated with the stored reference sensor measurement data is determined in dependence on the correlation procedure. The navigation system may further comprise a positioning sensor subsystem, which includes a mix of one or more absolute positioning modules or other logics and relative positioning modules or other logics.

The absolute positioning module according to US2014379254 A1 obtains data from absolute positioning sensors, including or example GPS or Galileo receivers. This data can be used to obtain an initial estimate as to the absolute position of the vehicle. A relative positioning module obtains data from relative positioning sensors, in this case laser sensors (any other suitable type of sensor can be used, for example radar, laser, optical (visible) or radio sensors). This data can be used to obtain the relative position or bearing of the vehicle compared to one or more landmarks or other features for which a digital map includes sets of landmark sensor measurement data.

The digital map database of US2014379254 A1 may store sensor measurement data obtained from previous sensor measurements. Additional relative positioning sensors can also be provided, for performance of further relative position measurements. The measurement data obtained from each of the sensors is compared to stored sensor measurement data to determine whether the sensor measurement signals match the stored reference measurement data, also referred to as landmark data, in a positioning process.

The goal of the positioning according to US2014379254 A1 is to find a correlation between the continuously acquired set of measurement data from the vehicle sensors and landmark measurement data stored in the database and then compute the relative position of vehicle against the landmark from position data for the landmark stored in the database.

SUMMARY

An object of the present invention is to provide an improved method and arrangement for sourcing of location information, generating and updating maps representing the location.

According to a first aspect there is provided a method for sourcing of location information, generating and updating maps representing the location, which comprises: obtaining, from at least two road vehicle passages at the location, vehicle registered data on the surrounding environment from environment sensors and positioning data from consumer-grade satellite positioning arrangements and from at least one of an inertial measurement unit and a wheel speed sensor; smoothing the positioning data to establish continuous trajectories for the respective vehicles; creating individual surrounding environment maps using the data on the surrounding environment and the smoothed positioning data from each respective vehicle passage at the location; identifying, from the individual surrounding environment maps, submaps sharing area segments; cross-correlating pairs of submaps sharing area segments; using the information from the pairwise cross-correlation of submaps for optimizing each submaps offset relative a full map of the surrounding environment; merging the submaps into the full map of the surrounding environment.

In a further embodiment the method further comprises using as environment sensors one or more of: radar-sensors; lidar-sensors; ultrasound-sensors; camera-sensors; IR-sensors.

In a yet further embodiment the method further comprises transforming vehicle registered data on the surrounding environment into two-dimensional grids when creating the individual surrounding environment maps and performing the cross-correlation of the pairs of submaps sharing area segments based on those two-dimensional grids.

In a still further embodiment the cross-correlation of the pairs of submaps sharing area segments further comprises identifying an intensity peak corresponding to a maximum overlap of submaps, indicative of the greatest correlation between the submaps and the position of the intensity peak.

In an additional embodiment the method further comprises determining a relative importance of a submap pair by analyzing the cross-correlation peak shape.

In yet an additional embodiment the method further comprises performing additional aligning of the rotation of the respective submaps.

In a still further embodiment the method further comprises identifying submaps containing information representative of an extension in the surrounding environment of up to 60×60 meters.

In a yet further embodiment the method further comprises identifying submaps containing information representative of an extension in the surrounding environment of at least 10×10 meters.

In yet an additional embodiment the method further comprises optimizing each submaps offset relative a full map of the surrounding environment using a Graph-SLAM approach, simultaneous localization and mapping, to find a configuration of the submap offsets that is maximally consistent with observations and moving the submaps into new offset positions corresponding thereto for merging thereof into the full map of the surrounding environment.

According to a second aspect there is provided an arrangement for sourcing of location information, generating and updating maps representing the location that comprises: a communication interface for receiving, from at least two road vehicle passages at the location, vehicle registered data on the surrounding environment from environment sensors and positioning data from consumer-grade satellite positioning arrangements and from at least one of an inertial measurement unit and a wheel speed sensor; and processing means including software for, when executed by the processing means, performing the following: smoothing of the positioning data to establish continuous trajectories for the respective vehicles; creating individual surrounding environment maps using the data on the surrounding environment and the smoothed positioning data from each respective vehicle passage at the location; identifying, from the individual surrounding environment maps, submaps sharing area segments; cross-correlating pairs of submaps sharing area segments; using the information from the pairwise cross-correlation of submaps to optimize each submaps offset relative a full map of the surrounding environment; merging the submaps into the full map of the surrounding environment.

The above embodiments have the beneficial effects of yielding up-to-date maps for autonomous road vehicles, in which maps localization is possible, maps that by performance are comparable to maps created from high-precision probing.

BRIEF DESCRIPTION OF DRAWINGS

In the following, embodiments herein will be described in greater detail by way of example only with reference to attached drawings, in which.

DESCRIPTION OF EMBODIMENTS

Figure 1:
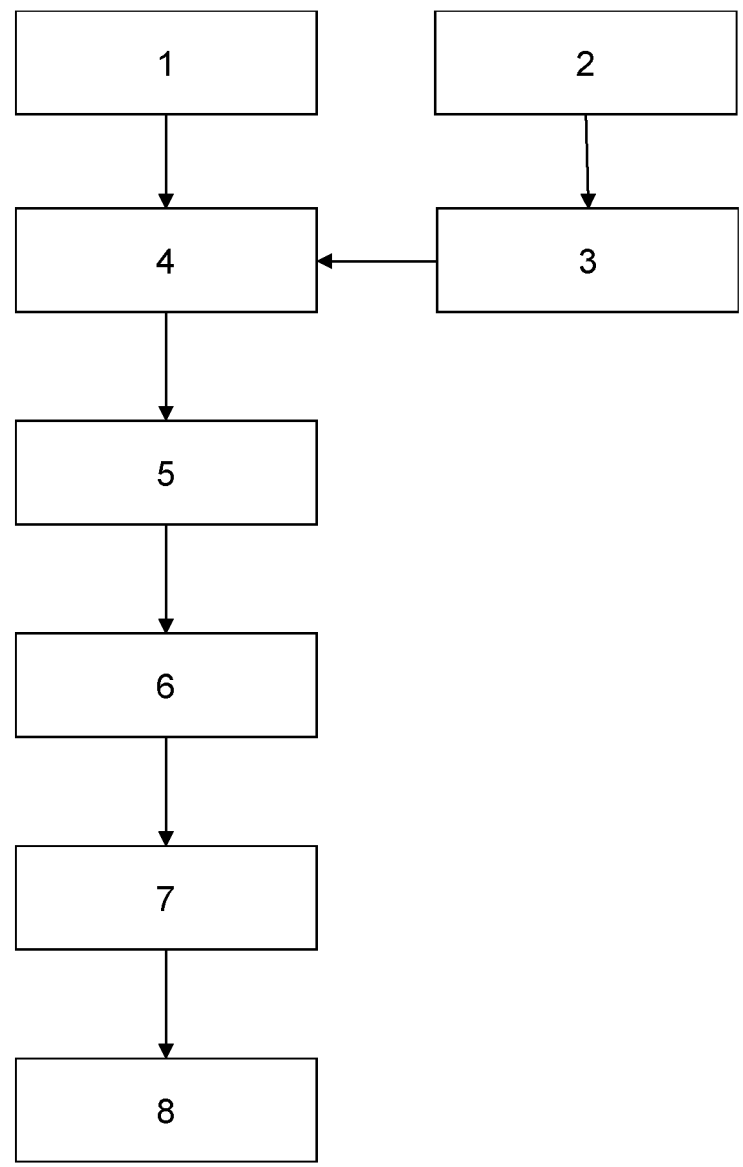
FIG. 1 illustrates schematically a method for sourcing of location information, generating and updating maps representing the location according to embodiments herein.

In the following will be described some example embodiments of a method and arrangement 10 for sourcing of location information, generating and updating maps 16 representing the location.

The proposed method and arrangement 10 relate to crowd sourcing of environment sensor maps 16 using consumer-grade sensors which maps 16 are adequate for enabling high precision localization, especially for autonomous road vehicles.

Crowd sourcing is a concept mainly referring to problem solving through workload distribution, where several users each contribute to solving a small part of the problem, thus collaboratively reaching a total solution.

Embodiments herein are based on a fleet of vehicles 12 collectively creating/updating a map 16 based on inaccurate observations from each vehicle 12, the inaccuracy of which will be compensated for as more information is added. It is further based on the realization that we are better off not trying to associate environment sensor detections to identified landmarks, or even sets of discrete landmarks, but instead aggregate several submap 15 registrations by environment sensors into a map which is quantized in space, e.g. as a grid map. Then we can view these small submaps 15 as measurements in the mapping process and get a considerably easier problem to solve.

Grid maps, or occupancy grid maps represents the world as divided into grids where each grid consists of a block of cells, each cell either occupied by an object with a certain likelihood or unoccupied. This likelihood can be approximated by using the amount of detections returned from an object divided by the maximum amount of possible detection returns. After postprocessing raw data collected from sensors, features of interest can be mapped into corresponding grids, where each grid can be checked independently from others.

By using consumer-grade satellite positioning arrangements, such as global positioning systems (GPS), and Inertial Measurement Units (IMU) and wheel speed sensors available in road vehicles 12, we get enough precision in angle and relative precision in position in the plane to accurately map areas up to about 60 meters in length. Since it is possible to obtain a good estimate of angle from a combination of GPS+IMU, the angle can be considered as known, and it is then only necessary to find the relative x and y offset of a local submap 15 in relation to submaps 15 of the same location from other passes by the same or other mapping road vehicles 12. This can be solved by pairwise cross-correlation of submaps 15 from the same area, and then setting up a linear equation system to solve for the unknown offsets in position for each pass.

The Global Positioning System (GPS) is a space-based radio navigation system that provides geolocation (latitude, longitude and height) and time information to a GPS receiver anywhere on or near Earth. Most GPS systems operate using three of more satellites in orbit around Earth, using timed signals to calculate the distance to each and thus triangulate the receiver's position on the surface. Other similar satellite positioning arrangements include the European global navigation satellite system (GNSS) also known as Galileo, or the Russian space-based satellite navigation system known as GLONASS.

Thus, provided herein is a method for sourcing of location information, generating and updating maps 16 representing the location. The proposed method comprises obtaining 1 vehicle registered data 13 on the surrounding environment from environment sensors and obtaining 2 positioning data from consumer-grade satellite positioning arrangements and from at least one of an inertial measurement unit and a wheel speed sensor. Data on the surrounding environment as well as positioning data is obtained from at least two road vehicle 12 passages at the location.

Consumer-grade GPS satellite positioning arrangements are currently available in most modern cars with the purpose of navigation. The positional accuracy that is available differs depending on manufacturer, but most literature describes the typical error as around 10 meters. This error is acceptable for navigation, however not for lane-positioning of autonomous road vehicles.

Sensors are devices that can sense their surroundings and handle various input signals. Those inputs could be light, colors, distance, angles or any other environmental phenomena. The usual outputs of sensors are generally signals that can be understood by computers, with the potential of visualization for human comprehension. As environment sensors in the proposed method may be used one or more of: radar-sensors; lidar-sensors; ultrasound-sensors; camera-sensors; IR-sensors.

A radar operates through a fairly simple concept whereby a radar transmitter emits waveform-signals of electromagnetic radiation with known frequency towards an area, and a receiver detects echoes of the signal being reflected back from objects. By analyzing the time between transmitting and receiving the signal, the range to the object can be determined. The angle to the object can also be determined by detecting the return angle of the signal. Based on the range and angle, the position of a detection relative to the radar device can thus be obtained. By also analyzing the shift in frequency of the returned signal, caused by the Doppler-effect, a relative velocity of the detected object can be determined, thus allowing the distinction of stationary objects from moving targets.

Lidar, light detection and ranging, is a surveying method that measures distance to a target by illuminating the target with pulsed laser light and measuring the reflected pulses with a sensor. Differences in laser return times and wavelengths can then be used to make digital representations of targets in the surroundings.

In a similar way to radar and lidar, ultrasonic sensors are often used in systems which evaluate targets by interpreting the reflected signals. For example, by measuring the time between sending a signal and receiving an echo the distance of an object can be calculated.

Camera-sensors may include forward looking cameras (FLC), which are image sensors using visible light as input and aims to identify objects in front of the road vehicle, especially lanes. Using well-known computer vision concepts, such as Hugh-transform and thresholding, the left and right markings of a current lane can be detected as seen from a camera, and by transforming the detected lanes from the projection frame to bird's eye vision using a top-view transformation, the lanes can thereafter be expressed with positions relative a local vehicle coordinate system.

An IR-sensor is a device that forms a heat zone image using infrared radiation, similar to a common camera that forms an image using visible light.

An inertial measurement unit (IMU) is a sensor mass that contain precision gyroscopes, accelerometers, and magnetometer sensors. Thus, these inertial sensors can measure not only angular velocity and linear acceleration, but also magnetic field strength. A common IMU has six degrees of freedom, three orthogonal gyroscope axes and three orthogonal accelerometer axes. Using a low cost IMU in conjunction with a consumer grade GPS and/or other low-cost sensors such as e.g. wheel speed sensors, the localization and mapping performance can be improved with increased accuracy.

Smoothing 3 of the positioning data is performed to establish continuous trajectories for the respective road vehicles 12, which trajectories can then be used to describe the relative motion of a respective road vehicle 12. Smoothing 3 is a term of methods that can generate a set of smooth data or estimate a state vector at some time of interest. Since filters can only estimate the current state given previous data, smoothing 3 can improve the accuracy of current state by using data from both previous and later times. Rauch-Tung-Striebel (RTS) smoothing is one of generally used smoothing methods. In the herein described method for sourcing of location information, generating and updating maps representing the location, it is suggested to use Rauch-Tung-Striebel (RTS) smoothing or, square-root unscented Rauch-Tung-Striebel smoothing, or to use a square-root Unscented Kalman Filter (UKF) smoothing algorithm.

The method for sourcing of location information, generating and updating maps 16 representing the location, further comprises creating, using a map-creation algorithm, individual surrounding environment maps using the data on the surrounding environment and, as ground truth, the smoothed positioning data from each respective road vehicle 12 passage at the location. The map-creation algorithm may e.g. be arranged to calculate detection intensity in a histogram like grid.

Some embodiments further comprise transforming road vehicle 12 registered data on the surrounding environment into two-dimensional grids when creating the individual surrounding environment maps. Such transformation is a simple coordinate transform from a coordinate system that an environment sensor report detection in, to a global coordinate system.

The method for sourcing of location information, generating and updating maps 16 representing the location, furthermore comprises identifying 5, from the individual surrounding environment maps, submaps 15 sharing area segments. This is done using the approximate location that a consumer-grade satellite positioning arrangement provides. Since the error in heading caused by the smoothing 3 is assumed to be very low, all submaps 15 can be regarded as approximately aligned with each other in terms of rotation.

The method for sourcing of location information, generating and updating maps 16 representing the location, also comprises cross-correlating 6 pairs of submaps 15 sharing area segments. Cross-correlation is widely used as a similarity measurement in signal processing. Similarly, 2D cross-correlation is used for image pattern matching, where one image serve as a template to be matched in the other, and is a way to find the positions where two images (or matrices) most resemble each other. This is done by choosing one of the images as the template, and iteratively shift this image over the other and calculate the overlapping sum for each element in the cross-correlation matrix.

In embodiments where road vehicle 12 registered data on the surrounding environment has been transformed into two-dimensional grids when creating the individual surrounding environment maps, the cross-correlation 6 of the pairs of submaps 15 sharing area segments is based on those two-dimensional grids.

However, after the previously mentioned cross-correlation 6 process, the submaps 15 are normally not sufficiently positioned in respect to each other. Should a map-merge be attempted at this stage, the resulting map would be very blurry and unable to provide satisfying localization results.

Thus, the method also comprises using the information from the pairwise cross-correlation of submaps for optimizing 7 each submaps 15 offset relative a full map 16 of the surrounding environment and merging the submaps 15 into the full map 16 of the surrounding environment.

In order to correctly align the submaps 15, a Graph-SLAM, simultaneous localization and mapping, approach is implemented to find the configuration of the submap 15 offsets that is maximally consistent with observations, i.e. a node configuration that minimizes the sum of all errors squared, also known as the log-likelihood of all observations. Since the submaps 15 can be regarded as approximately aligned with each other in terms of rotation the least-squares Graph-SLAM formulation can be solved as a weighted linear system. After the submaps 15 have been moved into their new positions, the submaps 15 are merged to yield the final crowd-sourced full map 16.

In robotic navigation, simultaneous localization and mapping (SLAM) is the process of iteratively constructing a map of the robot's unknown surroundings while simultaneously finding the robot's unknown position in said map, hence the name. For this method offline SLAM will be considered, i.e. data will have already been collected by road vehicles 12 passing the location of interest and the total map 16 will be built a posteriori.

One representation of the SLAM-problem for offline mapping can take the form of a graph, with nodes corresponding to the robot's poses and edges representing spatial constraints between each node-pair from measurements. This representation of the SLAM-problem is called Graph-based SLAM. The solution to the Graph-SLAM problem is the node configuration that minimizes the sum of all errors squared, also known as the log-likelihood of all observations, alternatively meaning the configuration that maximizes the consistency of measurements.

Thus, in a general embodiment, as illustrated schematically in FIG. 1, the method comprises:

from at least two road vehicle passages at the location, obtaining vehicle registered data on the surrounding environment 1 from environment sensors and obtaining positioning data 2 from consumer-grade satellite positioning arrangements and from at least one of an inertial measurement unit and a wheel speed sensor;

smoothing the positioning data 3 to establish continuous trajectories for the respective vehicles;

creating individual surrounding environment maps 4 using the data on the surrounding environment and the smoothed positioning data from each respective vehicle 12 passage at the location;

identifying 5, from the individual surrounding environment maps, submaps 15 sharing area segments;

cross-correlating 6 pairs of submaps 15 sharing area segments;

using the information from the pairwise cross-correlation of submaps 15 for optimizing 7 each submaps 15 offset relative a full map 16 of the surrounding environment;

merging 8 the submaps into the full map 16 of the surrounding environment.

The cross-correlation 6 of the pairs of submaps 15 sharing area segments may in further embodiments comprise identifying an intensity peak corresponding to a maximum overlap of submaps 15, indicative of the greatest correlation between the submaps 16 and the position of the intensity peak. The cross-correlation 6 represents the degree of similarity between two submap 15 histograms, where a maximum intensity peak of the cross-correlation 6 would refer to maximal overlap of the histograms.

A relative importance of a submap 15 pair may in additional embodiments be determined by analyzing the cross-correlation peak shape. We assume that the cross-correlation 6 of the two submaps 15 is proportional to the log likelihood of the two submaps 15 having a particular offset. The peak value is found at the maximally likely offset, and the curvature at the peak can be interpreted as a measure of certainty, and be used to calculate a covariance matrix, which later can be used to represent the uncertainty of the found offsets for each submap 15 pair. This is useful information in the optimization process 7.

Should the directional information from the smoothing 3 be insufficient, according to yet an additional embodiment of the method, it is suggested to perform additional aligning of the rotation of the respective submaps 15.

The method, in a still further embodiment, comprises identifying submaps 15 containing information representative of an extension in the surrounding environment, i.e. environment surrounding a mapping road vehicle 12, of up to 60×60 meters. The maximum submap 15 size is related to an error in the smoothed trajectory, and the desired precision in the full map 16. Thus, if better quality IMU or wheel speed sensors are used, or one can accept lower precision maps, the submap 15 size can be bigger. The 60 meters here assumes automotive grade sensors and a precision of a few decimeters in the full map 16.

In a yet further embodiment the method comprises identifying submaps 15 containing information representative of an extension in the surrounding environment of at least 10×10 meters. The minimum submap 15 size relates to the information content in each submap 15, i.e. how many different sources one can expect to detect in each submap 15. If the environment sensors detect lane markers, traffic signs and other road side poles, it would be hard to use smaller submaps 15 than 10 meters.

Each submaps 15 offset relative a full map 16 of the surrounding environment may, in yet an additional embodiment of the method, be optimized using a Graph-SLAM approach, simultaneous localization and mapping, to find a configuration of the submap 15 offsets that is maximally consistent with observations and moving the submaps 15 into new offset positions corresponding thereto for merging thereof into the full map 16 of the surrounding environment.

Thus, provided hereby is a method that enables yielding of up-to-date maps 16 for autonomous road vehicles that by performance are comparable to maps created from high-precision probing, in which localization is possible.

Through continuously adding information from road vehicles 12 passing different locations of interest and repeating the method of merging aligned and optimized submaps 15 into a full map 16, high-quality up-to date full maps 16 of a surrounding environment can be generated and maintained.

Figure 2:
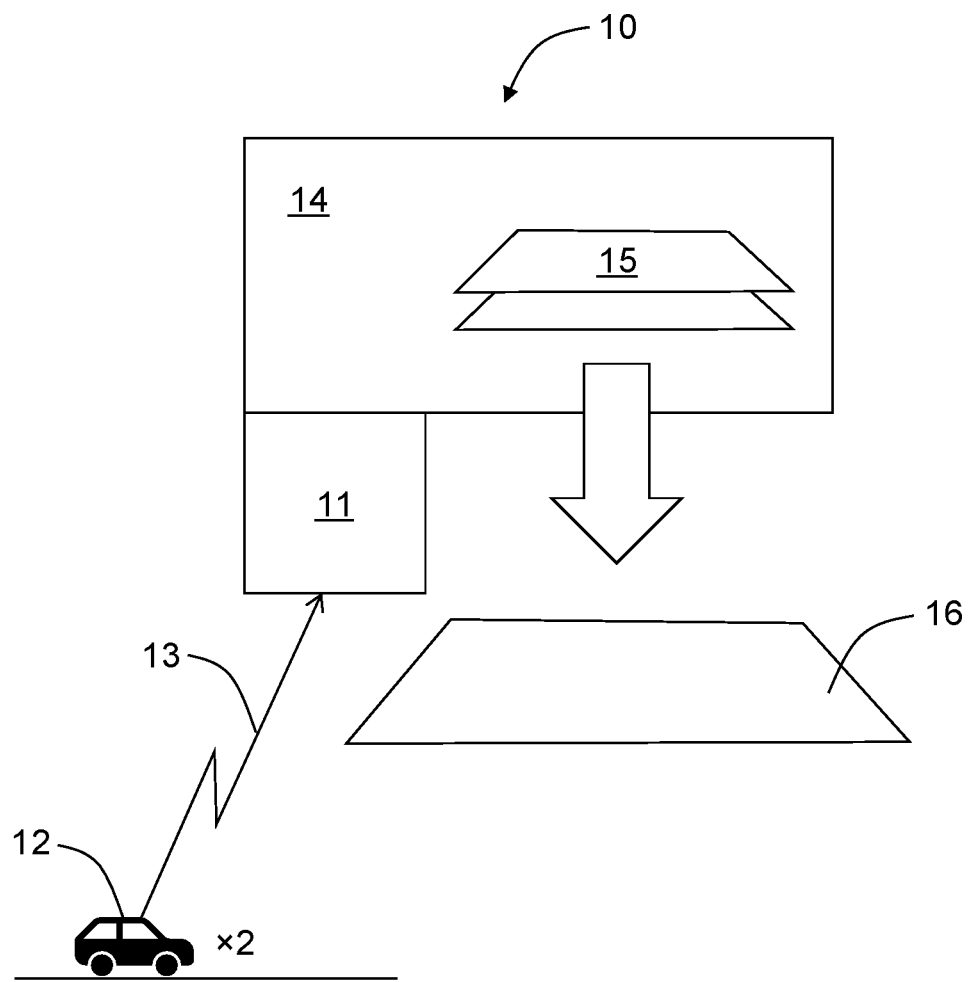
FIG. 2 illustrates schematically an arrangement for sourcing of location information, generating and updating maps representing the location according to embodiments herein.

According to a second aspect there is provided an arrangement 10, as illustrated schematically in FIG. 2, for sourcing of location information, generating and updating maps 16 representing the location. The arrangement 10 comprises a communication interface 11 for receiving, from at least two road vehicle 12 passages at the location (indicated in FIG. 2 by the notation "×2" by the road vehicle 12), vehicle registered data 13 on the surrounding environment from environment sensors and positioning data from consumer-grade satellite positioning arrangements and from at least one of an inertial measurement unit and a wheel speed sensor. The communication interface 11 is preferably arranged to receive road vehicle data using wireless data communication, e.g. over a cellular-radio network or similar.

The arrangement 10 further comprises processing means 14 including software for, when executed by the processing means, performing the following: smoothing 3 of the positioning data to establish continuous trajectories for the respective vehicles 12; creating 4 individual surrounding environment maps using the data on the surrounding environment and the smoothed positioning data from each respective vehicle 12 passage at the location; identifying 5, from the individual surrounding environment maps, submaps 15 sharing area segments; cross-correlating 6 pairs of submaps 15 sharing area segments; using the information from the pairwise cross-correlation 6 of submaps 15 to optimize 7 each submaps 15 offset relative a full map 16 of the surrounding environment; and merging 8 the submaps 15 into the full map 16 of the surrounding environment.

The processing means 11 could be arranged in a road vehicle 12, at a remote server or in the so-called cloud or distributed therebetween.

Thus, provided hereby is an arrangement that has the beneficial effects of enabling the yielding of up-to-date maps for autonomous road vehicles that by performance are comparable to maps created from high-precision probing, in which localization is possible.

The arrangement 10 allows for continuously adding information from road vehicles 12 passing different locations of interest and for repeating a process of merging aligned and optimized submaps 15 into a full map 16, thus allowing high-quality up-to date full maps 16 of a surrounding environment to be generated and maintained.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

The invention claimed is:

1. A method for sourcing of location information, generating and updating maps representing the location, comprising:
   obtaining, from at least two road vehicle passages at the location, vehicle registered data on the surrounding environment from environment sensors and positioning data from consumer-grade satellite positioning arrangements and from at least one of an inertial measurement unit and a wheel speed sensor;
   smoothing the positioning data to establish continuous trajectories for the respective vehicles;

creating individual surrounding environment maps using the data on the surrounding environment and the smoothed positioning data from each respective vehicle passage at the location;

identifying, from the individual surrounding environment maps, submaps sharing area segments;

cross-correlating pairs of submaps sharing area segments;

using the information from the pairwise cross-correlation of submaps for optimizing each submaps offset relative a full map of the surrounding environment; merging into the full map of the surrounding environment.

2. A method according to claim 1, wherein it further comprises using as environment sensors one or more of: radar-sensors; lidar-sensors; ultrasound-sensors; camera-sensors; IR-sensors.

3. A method according to claim 1, wherein it further comprises transforming vehicle registered data on the surrounding environment into two-dimensional grids when creating the individual surrounding environment maps and performing the cross-correlation of the pairs of submaps sharing area segments based on those two-dimensional grids.

4. A method according to claim 1, wherein the cross-correlation of the pairs of submaps sharing area segments further comprises identifying an intensity peak corresponding to a maximum overlap of submaps, indicative of the greatest correlation between the submaps and the position of the intensity peak.

5. A method according to claim 4, wherein it further comprises determining a relative importance of a submap pair by analyzing the cross-correlation peak shape.

6. A method according to claim 1, wherein it further comprises performing additional aligning of the rotation of the respective submaps.

7. A method according to claim 1, wherein it further comprises identifying submaps containing information representative of an extension in the surrounding environment of up to 60×60 meters.

8. A method according to claim 7, wherein it further comprises identifying submaps containing information representative of an extension in the surrounding environment of at least 10×10 meters.

9. A method according to claim 1, wherein it further comprises optimizing each submaps offset relative a full map of the surrounding environment using a Graph-SLAM approach, simultaneous localization and mapping, to find a configuration of the submap offsets that is maximally consistent with observations and moving the submaps into new offset positions corresponding thereto for merging thereof into the full map of the surrounding environment.

10. Arrangement for sourcing of location information, generating and updating maps representing the location, comprising:

a communication interface for receiving, from at least two road vehicle passages at the location, vehicle registered data on the surrounding environment from environment sensors and positioning data from consumer-grade satellite positioning arrangements and from at least one of an inertial measurement unit and a wheel speed sensor; and processing means including software for, when executed by the processing means, performing the following:

smoothing of the positioning data to establish continuous trajectories for the respective vehicles;

creating individual surrounding environment maps using the data on the surrounding environment and the smoothed positioning data from each respective vehicle passage at the location;

identifying, from the individual surrounding environment maps, submaps sharing area segments;

cross-correlating pairs of submaps sharing area segments;

using the information from the pairwise cross-correlation of submaps to optimize each submaps offset relative a full map of the surrounding environment;

merging the submaps into the full map of the surrounding environment.

\* \* \* \* \*